(No Model.)

J. W. LESLIE.
MEASURING DEVICE FOR LIQUIDS.

No. 476,470. Patented June 7, 1892.

Witnesses.
Fred S. Greenleaf
Edward F. Allen

Inventor.
James W. Leslie,
by Crosby & Gregory Attys.

UNITED STATES PATENT OFFICE.

JAMES W. LESLIE, OF EVERETT, MASSACHUSETTS.

MEASURING DEVICE FOR LIQUIDS.

SPECIFICATION forming part of Letters Patent No. 476,470, dated June 7, 1892.

Application filed September 3, 1891. Serial No. 404,624. (No model.)

*To all whom it may concern:*

Be it known that I, JAMES W. LESLIE, of Everett, county of Middlesex, State of Massachusetts, have invented an Improvement in Measuring Devices for Liquids, of which the following description, in connection with the accompanying drawings, is a specification, like letters on the drawings representing like parts.

This invention has for its object to construct a simple, cheap, and efficient device, which may be applied to a stopper of bottles for the purpose of measuring quantities of medicine to be taken as doses.

In accordance with this invention two tubes are placed so as to fit closely yet work easily one within the other, the outer tube having an upper open end and a lower closed end and a side opening near the lower end, and the inner tube being open at each end and having a side opening near its lower end which is adapted to register with the side opening in the outer tube or when turned within the outer tube to close the side opening in said outer tube. The tubes are made long enough to pass through the stopper of the bottle and project slightly therefrom at the interior. The upper open end of the inner tube is closed by a stopper, and the two tubes are preferably connected by a bayonet-joint or other suitable connection.

Figure 1:
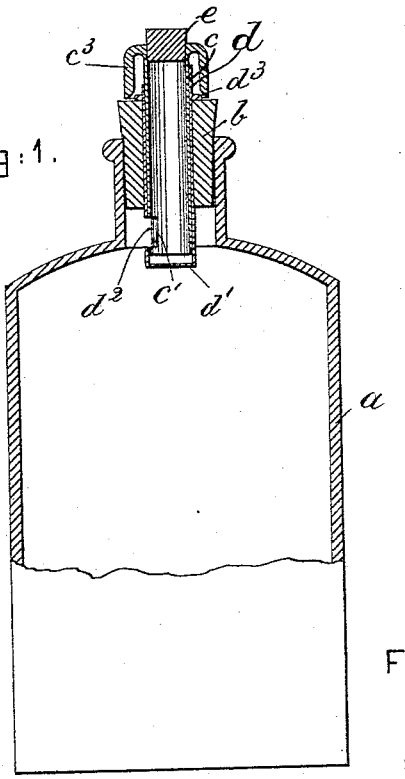
Figure 2:
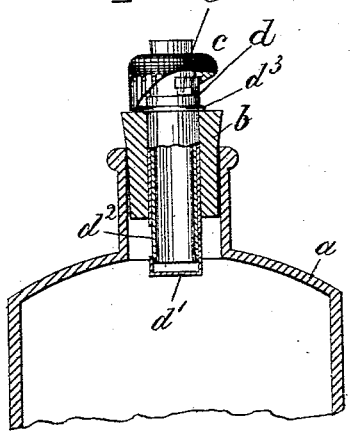
Figure 4:
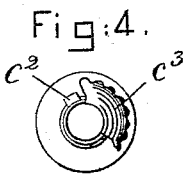

Figure 1 shows in vertical section and partial elevation a bottle having a stopper provided with a liquid-measure embodying this invention; Fig. 2, a similar view, the parts being in a different position; and Figs. 3 and 4, details to be referred to.

The bottle $a$ and its stopper $b$, of cork or other suitable material, are of any well-known or suitable construction.

The liquid or medicine measure consists of a short tube $c$, circular in cross-section and preferably slightly sharpened at one end. This tube $c$ is open at each end, as best shown in Fig. 1, and also has a side opening $c'$ near its lower end. To the exterior of this tube $c$ near its upper end a small projection $c^2$ is affixed. Another short tube $d$ is employed as a component part of the liquid or medicine measure, said tube $d$ being made larger in diameter than the tube $c$ to receive the latter within it, yet present a tight and easy-working fit one within the other. The tube $d$ is closed at its lower end, as at $d'$, as best shown in Fig. 1, and has a side opening $d^2$, which when the tubes $c$ and $d$ are in a certain position one with relation to the other registers with the opening $c'$ in the tube $c$. The tube $d$ at its upper end is cut away or slotted, as best shown in Fig. 2, to receive the projection $c^2$ on the tube $c$, and thereby form a bayonet joint or connection to hold the tubes in place. A flange or collar $d^3$ is also formed upon or secured to the tube $d$ near its upper end.

Figure 3:
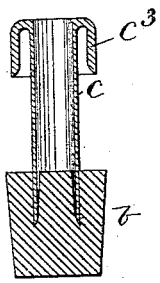

To secure the device to the stopper, the tube $c$ will be removed from its inclosing tube $d$ and by its sharpened end will be pushed through the stopper $b$, as represented in Fig. 3. It is then withdrawn from the stopper and the tube $d$ inserted, which closely fits the hole made by the tube $c$. The tubes are made long enough to pass completely through the stopper, as shown, to present the openings $c'$ $d^2$ to the interior of the bottle. The flange $d^3$ of the tube $d$ will at such time bear upon the top of the stopper. A small stopper $e$ is fitted into the tube $c$. The tube $c$ has an annular lip $c^3$, which may be ornamental, if desired, to inclose the bayonet-joint. With the measuring device applied in this way the tube $c$ will be turned within the tube $d$ until the openings $c'$ $d^2$ register, as shown in Fig. 1. The bottle $a$ will then be turned upside down and the liquid passing through the openings $c'$ $d^2$ will enter and fill the tube $c$. The tube will then be turned until the openings $c'$ $d^2$ do not register, and then by withdrawing the stopper $e$ the contents of the tube $c$ may be removed. Thus it will be seen that a specified quantity of liquid may be taken from the bottle $a$ without spilling, and, if desired, the patient may take the same directly from the tube $c$. The tube $c$ may be of such length and size as to hold, for instance, a single teaspoonful. The tube $d$, being closed at the end, serves as a bottom for the measuring-vessel, and when the said vessel is filled and the stopper $e$ withdrawn the liquid contents of the tube $c$ may be dropped very easily or poured out, as desired, or, as before stated, may be taken directly from the vessel.

The device is easy and cheap to manufacture, as well as to apply to a stopper and use.

I claim—

1. A measuring device for liquids, consisting of the tube $d$ to fit a hole through a stopper, made open at one end and closed at the opposite end and provided with a side opening $d^2$ near one end, and the tube $c$, adapted to fit and be turned within the tube $d$, made open at each end and provided with a side opening $c$ near one end to register with the opening $d^2$, and the stopper $e$ for the tube $c$, the bayonet-joint or equivalent by which said tubes $d$ and $c$ are connected, and the annular lip $c^3$ on the bayonet-joint of the tube $c$, which incloses and conceals the said bayonet-joint, substantially as described.

2. A measuring device for liquids, consisting of the tube $d$, adapted to be secured to a stopper, made open at one end and closed at the opposite end and provided with a side opening $d^2$ near one end, and the tube $c$, having the sharpened end and adapted to fit and be turned within the tube $d$, made open at each end and provided with a side opening $c'$ near one end to register with the opening $d^2$, and the stopper $e$ for the tube $c$, substantially as described 3. A measuring device for liquids, consisting of the tube $d$, adapted to be secured to a stopper, made open at one end and closed at the opposite end and provided with a side opening $d^2$ near one end and the flange $d^3$ near the opposite end, and the tube $c$, adapted to fit and be turned within the tube $d$, made open at each end and provided with a side opening $c'$ near one end to register with the opening $d^2$, substantially as described.

4. A measuring device for liquids, consisting of the tube $d$, adapted to be secured to a stopper, made open at one end and closed at the opposite end and provided with a side opening $d^2$ near one end, and the tube $c$, adapted to fit and be turned within the tube $d$, made open at each end and provided with a side opening $c'$ near one end to register with the opening $d^2$, said tubes having a bayonet-joint or equivalent by which they are connected, substantially as described.

In testimony whereof I have signed my name to this specification in the presence of two subscribing witnesses.

JAMES W. LESLIE.

Witnesses:
EVA I. HADLEY,
DUDLEY P. BAILEY.